June 6, 1939.　　　J. E. ECHLIN ET AL　　　2,161,146
APPARATUS FOR MEASURING FREQUENCY
Filed Aug. 15, 1936　　　3 Sheets-Sheet 1

INVENTORS
John E. Echlin
Lennart G. Erickson
BY
Charles M. Fryer
ATTORNEY.

FIG_3_

FIG_5_

June 6, 1939.  J. E. ECHLIN ET AL  2,161,146
APPARATUS FOR MEASURING FREQUENCY
Filed Aug. 15, 1936  3 Sheets-Sheet 3

FIG. 4

INVENTORS
John E. Echlin
Lennart G. Erickson
BY Charles M. Fryer
ATTORNEY.

Patented June 6, 1939

2,161,146

UNITED STATES PATENT OFFICE 2,161,146

APPARATUS FOR MEASURING FREQUENCY

John E. Echlin and Lennart G. Erickson, San Francisco, Calif., assignors to Echlin Manufacturing Co., San Francisco, Calif., a corporation of California Application August 15, 1936, Serial No. 96,256

16 Claims. (Cl. 175—368)

Our invention relates to a measuring apparatus and method for indicating the frequency of any cycle of events or for obtaining indications proportional to changes in such frequency, and more particularly to a method and apparatus for obtaining such indications from a pulsating, intermittent, fluctuating or alternating current which is associated with the frequency of the means or device the frequency of which is to be measured.

An apparatus and method of this character can be used any place where it is desired to measure frequency, for example, as a tachometer for measuring the revolutions per minute (R. P. M.) of an internal combustion engine. Tachometers for this purpose, have heretofore been employed in the form of devices the operations of which are essentially mechanical, i. e., mechanical revolution indicators or counters. However, such devices fail in accuracy because of wear in the mechanism.

Electrically operated apparatus has also been employed, one popular form of which comprises a generator for connection to the engine, and a meter for measuring the current generated. Such apparatus, however, may lack in accuracy, because the generator will not, under all conditions, generate current which is exactly directly proportional to the speed.

Our invention is designed to overcome the foregoing described difficulties, and has as its objects, among others, the provision of an improved apparatus and method of the character described which:

(1) Can be made to measure or indicate the frequency of certain cycles of events, with accuracy, irrespective of what such frequency may be;

(2) Involve substantially no moving parts that have, heretofore, been a source of error or wear in previous apparatus and methods;

(3) Irrespective of the frequency, will create a fixed quantity of a measurable factor for each cycle, so that an accurate total may be obtained;

(4) Are economical and substantially foolproof; and (5) Are of such character as to provide a simple and quickly attachable form of connection to certain types of movable mechanism, the frequency of which is to be measured.

Other objects of the invention will become apparent from the following description thereof.

In general, our invention comprises utilizing energy pulsations in the form of a pulsating, intermittent, fluctuating, or alternating current (hereinafter generically designated by the term "pulsating current") in synchronism with or proportional to the frequency of the cycle of events, such as R. P. M. to be measured; so that for each cycle or for any fixed number or fraction of cycles, there will always be a single pulsation of current. A satisfactory means for obtaining such pulsating current is an electrical circuit containing a circuit maker and breaker which may be in the form of a switch or equivalent means, so related with the mechanism the frequency of which is to be measured, as to create a single pulsation of current for each cycle or any fixed number or fraction of cycles of such frequency, each time the switch contacts complete a cycle of operation. An electrical measuring device or meter, in the form of a milliammeter of usual construction for indicating current flow, is provided; and current regulating means is associated with the measuring device for causing only a fixed quantity of current to flow through the meter, each time the contacts of the switch complete a cycle of operation, irrespective of the length of time the switch contacts remain open or closed, and irrespective of the character form or quantity of such current flow resulting from the opening or closing of the contacts.

Inasmuch as the number of pulsations of current through the current measuring meter per unit of time is the same as the number of times the switch contacts complete a cycle of operation, the latter being a direct function of the frequency, and since the current regulating means measures only a fixed quantity of current through the meter for each pulsation of current irrespective of the length of time the contacts remain open or closed during each cycle of their operation, it is apparent that the measurement of current as indicated by the meter will be directly proportional to the frequency. In other words, for each cycle of the pulsating current (a cycle of the pulsating current being the total of that part of the time current flows and that part of the time current does not flow during each cycle of operation of the circuit maker and breaker), a fixed quantity of current will flow through the meter irrespective of the duration or quantity of the pulsation.

Reference will now be made to the drawings for a more detailed description of the invention, in which the principles thereof are more fully explained.

The method and apparatus of our invention will be developed by reference first to certain simple or academic forms thereof, as it is believed that this will facilitate a clearer understanding of the subsequently described commercial form now being manufactured.

Figure 1:
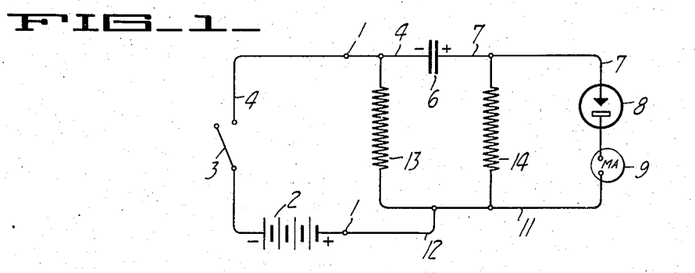
Fig. 1 illustrates schematically a form of apparatus of our invention, in which the current regulating means includes capacitor means in the form of a condenser.

In Fig. 1, the apparatus is connectable at 1 with an input source of electrical energy in the form of battery 2, which provides a substantially constant potential. The negative pole of the battery is connected to switch 3 connected by conductor 4 to a capacitor in the form of condenser 6 of substantially fixed predetermined capacitance. Condenser 6 is also connected by conductor 7 to a suitable half-wave rectifier 8, preferably a metallic rectifier which allows current to flow in one direction. Rectifier 8 is connected to milliammeter 9 in turn connected by conductors 11 and 12 to the positive pole of battery 2. Resistors 13 and 14, of predetermined fixed value, are connected one at each terminal of condenser 6, and to conductors 12 and 11, respectively. Switch 3 is adapted to be opened and closed by any suitable means in synchronism with or proportional to the frequency to be indicated. Some devices have an electrical circuit associated therewith in which contacts are opened and closed directly proportional to the speed of operation of such devices, and switch 3 may correspond to such contacts. The ignition contacts in an ignition system for a gas engine operate in this manner, as will be more fully pointed out with subsequently described modifications. In case the apparatus is to be employed with devices which do not include an electrical circuit having contacts operable in the manner explained, switch 3 may be incorporated as an actual part of the measuring apparatus, and be operated in synchronism with the frequency to be measured, by any suitable means.

In operation, during that part of a cycle of operation of switch 3 when it is closed, an impulse or pulsation of current will flow from the negative side of the battery through resistors 13 and 14, and through rectifier 8 from conductor 7. The current will, however, only flow through rectifier 8 and resistor 14 when the condenser is charging. As soon as the condenser is charged, no more current will flow therethrough. The condenser is of a predetermined fixed capacitance, and since the resistance value associated with the condenser and the potential of battery 2 are substantially constant, the condenser will always take the same time to be charged with a fixed quantity of current, irrespective of how long switch 3 remains closed during each cycle of operation thereof. It is thus seen that only a fixed regulated quantity of current can flow through the rectifier from conductor 7, each time the condenser is charged. Such time will always be the same, irrespective of how long switch 3 remains closed, for the reasons stated. Therefore, the same quantity of current will flow through rectifier 8 for each cycle of operation of switch 3. Upon opening of switch 3 during a cycle of operation thereof, resistors 13 and 14 form a closed circuit through which condenser 6 can discharge; the flow of current being in the direction from resistor 13 to resistor 14. None of the condenser discharge current is capable of passing through meter 9 because upon discharge of the condenser, the current flow is reversed through resistor 14, and rectifier 8 allows current to flow in one direction.

It is, thus, seen that for each input pulsation or impulse of current during a cycle of operation of switch 3, a fixed quantity of current will flow through meter 9, irrespective of the duration of such input current pulsation. As a result, the needle of meter 9 will be moved by a fixed quantity of current, each time the condenser charges during each cycle of operation of switch 3. Since the frequency of operation of switch 3 is proportional to the frequency to be measured, the total quantity of current flowing through the meter per unit of time will be a function of such frequency being measured. Unless, the frequency is extremely low, the needle of the meter will assume a fixed position through inertia and damping, as determined by the current flow therethrough, which flow will be directly proportional to the frequency being measured, because it does not depend upon the length of time switch 3 remains closed during each cycle of operation thereof. It is only necessary in order to obtain accurate results for all frequencies to be measured, that in each cycle of operation of the switch contacts, the time to charge the condenser be less than the time switch 3 is closed, or, in other words, less than the duration of the input current pulsation to the circuit, and that the time to discharge the condenser be less than the time switch 3 is open.

These two factors can be readily controlled in accordance with the frequencies to be measured, by choosing the correct character or values of the current regulating elements in the circuit. In this connection, the discharging or charging of condenser 6 can be made almost instantaneous in its character by choosing the proper condenser capacitance, and resistances for resistors 13 and 14.

In the above described circuit, if the battery connections are reversed or if the rectifier connections are reversed, the needle of the meter 9 will be moved during each pulsating current cycle, or, in other words, cycle of operation of switch 3, only on the discharge of the condenser upon opening of switch 3, and under a potential determined by the drop across resistor 14. As the condenser is of fixed capacitance, it will be apparent that the same quantity of current will flow through meter 9 for each discharging of the condenser, and independent of the length of time switch 3 remains open, to thereby provide the accurate indication in the manner previously related. Connection 13, which is connected between the battery and switch 3 ahead of condenser 6, is necessary to provide a closed circuit in conjunction with connection 14 for discharge of the condenser 6, and is in the form of a resistance to prevent shorting of the battery when switch 3 is closed.

Figure 2:
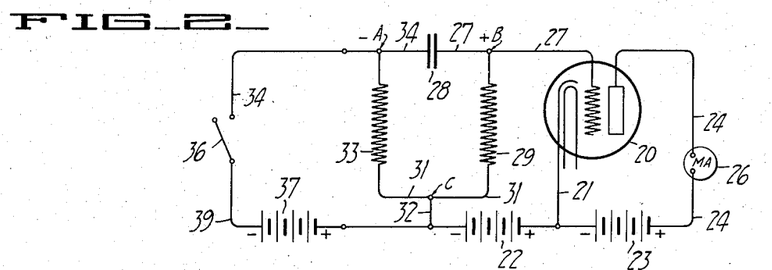
Fig. 2 illustrates schematically a form of apparatus similar to that illustrated in Fig. 1, but in which means is employed for amplifying the current.

Fig. 2 illustrates a more practical form of circuit, in which a vacuum tube 20 of the triode indirectly heated cathode type, is employed as an amplifier, thereby requiring a less sensitive meter than the form of apparatus illustrated in Fig. 1. The cathode of such tube is connected by conductor 21 between the positive pole of C-battery 22 and the negative pole of B-battery 23 which in turn is connected to the plate by conductor 24 in which is connected meter 26. The grid of tube 20 is connected by conductor 27 to one terminal of a capacitor in the form of fixed condenser 28, and to the negative pole of C-battery 22 through resistor 29 of a fixed predetermined resistance, conductor 31 and conductor 32; conductor 31 being also connected to resistor 33, of fixed predetermined resistance, which is connected to the opposite terminal of condenser 28 through conductor 34 connected to one pole of switch 36 which operates the same as switch 3 in the Fig. 1 modification. Switch 36 is also connected by conductor 39 to the negative pole of battery 37 which supplies an input current at substantially constant potential. Thus, resistors 29 and 33 are in a closed circuit with condenser 28.

B-battery 23, in accordance with usual practice, applies a potential between the cathode and the plate of tube 20, so that the cathode is negative with reference to the plate. However, C-battery 22 is of such character as to apply normally a potential between the grid and cathode, so as to make the grid negative with reference to the cathode to prevent or block the flow of current between the cathode and the plate. If switch 36 is maintained open, it will be apparent that no current will flow through meter 26. Upon closing of switch 36, resulting from operation of the means the frequency of which is to be measured, current will flow from the negative pole of battery 37 back to the positive pole of such battery, first through both resistors 33 and 29, while the condenser 28 is being charged, such charge being negative adjacent the terminal indicated by A and positive adjacent the opposite terminal indicated by B. As soon as the condenser becomes charged completely, current will flow back to battery 37 only through resistor 33. In this connection, it is to be noted that since the capacitance of condenser 28 is fixed and since the potential of battery 37 is substantially constant, the condenser will always be charged to the same amount irrespective of how long switch 36 remains closed.

Upon opening of switch 36, condenser 28 will discharge, and current will flow from point A, through resistor 33, conductor 31, and resistor 29 to point B. During such discharging of the condenser, a voltage will be built up across resistor 29, which is of such polarity that point B will be positive with respect to point C; such polarity being in opposition to the potential applied to the grid by C-battery 22. As a result, the grid of tube 20 will have less potential imposed thereon determined by the voltage built up across resistor 29 which is of such predetermined resistance as to provide a sufficient potential to unblock the grid of tube 20. This allows an impulse of current to flow through tube 20 from B-battery 23 to move the meter needle. Such impulse of current will flow only during the discharge of condenser 28 because it is only during this period that the grid-cathode circuit of tube 20 is unblocked.

Since the condenser is always charged with a fixed quantity of current, or in other words with a fixed amount of electricity, it will discharge the same fixed quantity. Hence, the quantity of current from B-battery 23 which flows through the tube during discharge of the condenser will always be the same, inasmuch as the tube can only pass current while the condenser is discharging. Thus, it is seen that during each cycle of operation of switch 36, a pulsation of current will be supplied to the input of the apparatus; and upon opening of switch 36 during such cycle, a fixed quantity of current will flow through meter 26 irrespective of the duration of the input pulsation of current supplied through switch 36 during each cycle of operation thereof. In other words, during each cycle of the input pulsating current, a fixed quantity of current will always flow through the meter regardless of the duration of the input pulsations. Therefore, as with respect to the Fig. 1 modification, meter 26 will measure current directly proportional at all times to the frequency of the means actuating switch 36; so that this frequency can be accurately measured.

In Fig. 2 modification, as with respect to the Fig. 1 modification, it will be observed that, the condenser circuit including resistors 33 and 29, which perform the same functions as the corresponding resistors in the Fig. 1 modification, serves as the regulating means for causing only a fixed quantity of current to flow through meter 26 for each cycle of operation of switch 36. In this connection, the amount of such fixed quantity of current may be readily controlled to suit varying conditions, by selecting the value of resistance associated with the condenser, the condenser capacitance, or the potential of battery 37, or any of them.

Figure 3:
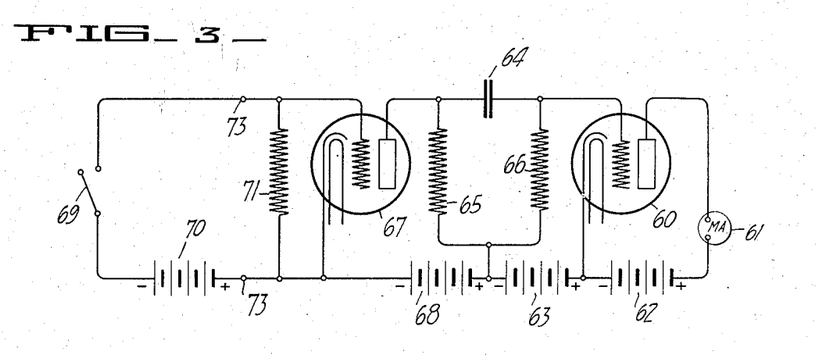
Fig. 3 illustrates schematically a more practical form of apparatus of the type illustrated in Figs. 1 and 2.

In our preferred construction, the principle of the Fig. 2 modification is employed because of its accuracy, and sensitivity resulting from the provision of the amplifying vacuum tube. To obtain greater sensitivity and amplification with less voltage applied to the input circuit, we, preferably, employ two or more vacuum tubes. One of such vacuum tubes, namely, the input tube serves, in addition, to render the apparatus non-sensitive to variations in voltage of the input pulsating current. Fig. 3 illustrates such arrangement with two vacuum tubes. Tube 60, milliammeter 61, B-battery 62, C-battery 63, fixed condenser 64, and resistors 65 and 66 are connected together in the same manner as the corresponding elements illustrated in Fig. 2. Hence, tube 60 is normally biased to cut-off by the potential of C-battery 63 applied to the control grid of tube 60, so that no current can flow therethrough.

The circuit also includes input tube 67 and B-battery 68 therefor, which are connected in series with the closed regulating circuit including condenser 64 and resistors 65 and 66; the control grid of tube 67 being connectable through switch 69 with battery 70. Switch 69 corresponds to and functions the same as the switches in the previously described modifications. Shunt resistor 71 is of comparatively high resistance to maintain grid circuit continuity and circuit stability when the contacts of switch 69 are open. It will be noted that the regulating circuit including condenser 64 and resistors 65 and 66, is connected between the plate of input tube 67 and the control grid of output tube 60, and also between C-battery 63 which applies the cut-off biasing potential to the control grid of tube 60, and B-battery 68 which applies potential between the cathode and the plate of input tube 67 to cause flow of current therethrough.

Tube 67 is of such character that when switch 69 is open, a continuous direct current, caused by the applied voltage of battery 68, will flow from the cathode to the plate and back to the battery through resistor 65. The current flowing through resistor 65 causes a voltage to appear thereacross, and condenser 64 will thus be charged to the same fixed potential as such voltage, and remain charged at this fixed potential irrespective of how long switch 69 remains open. However, because the tube 60 is normally blocked or biased to cut-off, no current will flow through meter 61 as was previously explained. The character of tube 67 is also such that immediately upon closing of switch 69, a current from battery 70 will flow through resistor 71 to cause a voltage to appear across such resistor, so as to make the control grid of tube 67 negative with respect to the cathode thereof to stop or block the flow of plate current through such tube.

This causes disappearance of the voltage across resistor 65, to allow condenser 64 to discharge through the closed regulating circuit, including resistors 65 and 66, which, as explained in the Fig.-2 modification, unblocks tube 60; and a fixed quantity of current will flow through the tube 60, for the reasons previously explained. Hence, for each cycle of operation of switch 69, or, in other words, for each cycle of the pulsating input current supplied to the circuit, a fixed quantity of current will flow through meter 61. From the preceding it is seen that during one part of each cycle of such pulsating input current when switch 69 is open, the control grid of tube 60 is biased to cut-off to block the flow of current therethrough, and input tube 67 passes current to charge the condenser with a fixed quantity of current. During a second part of each cycle of such pulsating input current when switch 69 is closed, the control grid of input tube 67 is biased to cut-off to block the flow of current through the input tube, and thereby allow the condenser 64 to discharge the fixed quantity of current which causes unblocking of tube 60 which allows a fixed quantity of current to flow through meter 61.

Since switch 69 is operated by the means the frequency of which is to be measured or indicated, its cycles of operation will be directly proportional to the frequency, and meter 61 will indicate such frequency in the manner previously related. In this connection, the discharge period of condenser 64 should be made less than the time switch 69 remains closed and the charging period of the condenser should be made less than the time the switch remains open, for the reasons previously pointed out. These factors can be readily controlled by choosing the proper character of elements making up the apparatus.

For indicating the R. P. M. of an engine, input tube 67 is of the 2A6 type known as a duplex-diode high-mu triode" and tube 60 is one standard triode section of the type now known as 53. From the characteristics of such triode section, the flow of current through the tube can be effectively blocked under a condition of 250 volts applied plate potential, by a negative voltage of 12 applied to the control grid. Hence, B-battery 62, or any equivalent source of potential, has a voltage of about 250; and C-battery 63 a voltage of about 12. With reference to tube 67, it is of such nature that under the condition of 113 volts applied plate potential, a negative potential of at least 2 volts applied to the grid with respect to its cathode, effectively stops the flow of plate current therethrough. Hence, B-battery 68 is of about 113 volts, and battery 70, may be of any voltage from about 2 up to the insulation breakdown point of tube 67. However, if a suitable resistance is placed in series with one input terminal of tube 67, battery 70 may be of even higher voltage; it being, of course, understood that the batteries may be replaced by equivalent sources of potential, such as a conventional voltage divider system fed from a power line.

Resistor 71 is of about 100,000 ohms; resistor 65 of about 750,000 ohms; resistor 66 of about 500,000 ohms; and condenser 64 of about 0.00025 microfarad capacitance. For any given condenser capacitance, the time of charging and discharging thereof, which controls the fixed quantity of current that can flow to the meter, can be controlled by the value of resistance associated with the condenser. The above values are employed because they have been found most suitable in the particular environment for which the apparatus has now found great applicability.

When employed for indicating R. P. M. of an engine, the switch 69, schematically represented in Fig. 3, corresponds to the contacts of the distributor in the ignition system and battery 70 to a source of potential in such system, the apparatus being made as a separate unit having leads adapted for connection to the ignition system, as indicated at 73. As previously related, tube 67 is of such character as to be blocked by a negative potential of at least 2 volts applied to its grid. Therefore, since the battery of an ignition system in the usual types of engines, never falls below 2 volts, any variation in voltage above 2 volts can have no effect on the apparatus.

The apparatus of Fig. 3 will operate successfully. However, it requires a very sensitive meter. To make the apparatus commercially practical, we preferably employ another vacuum tube for amplification, thus allowing the use of a more rugged and less costly meter or similar indicating device. Also, the commercial apparatus of our invention, has means enabling any commercial power line to supply the voltages required, together with means enabling calibration of the apparatus from an alternating current type of such line. Such commercial form of apparatus is indicated schematically in Fig. 4.

Figure 4:
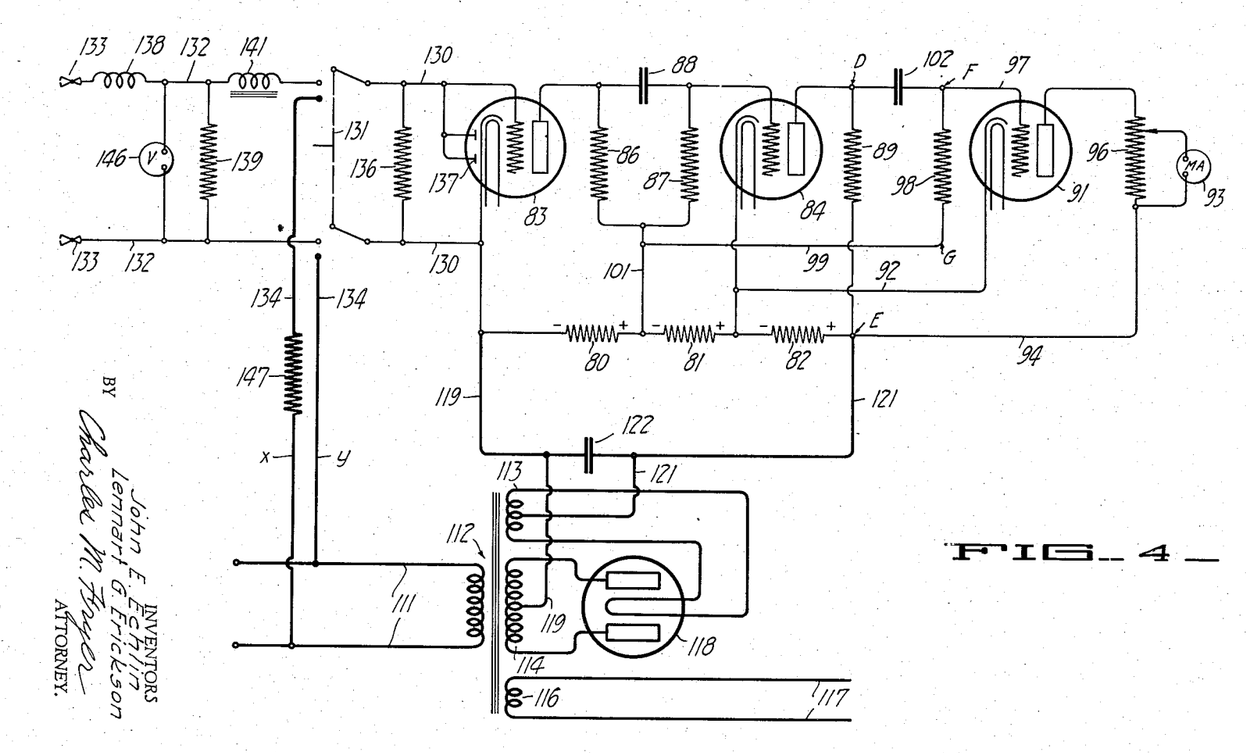
Fig. 4 illustrates schematically the preferred commercial form of apparatus which is adapted for connection to the ignition system of an engine for measuring R. P. M. of the engine, and which has means for calibrating the apparatus.

In such apparatus, resistors 80, 81 and 82 of preselected resistance, which are supplied with direct current through any suitable rectifier means from any alternating current commercial power line supplying any of the standard voltages and frequencies, in a manner to be subsequently described, are employed in a voltage divider system in place of batteries 68, 63 and 62, respectively, in Fig. 3. Tubes 83 and 84, and the regulating or metering circuit including resistors 86 and 87 and fixed condenser 88, are connected in the same manner as tubes 67 and 60, and the associated regulating circuit, respectively, in Fig. 3. However, instead of an ammeter connected with the plate of tube 84 and the power source, a resistor 89 is connected in its place, one terminal of such resistor being connected to resistor 82.

The cathode of a third tube 91 is connected through conductor 92 with the cathode of tube 84; and the plate of such tube is connected with ammeter 93 in turn connected through conductor 94 with one terminal of resistor 82 of the source of power; such terminal being the same as that to which resistor 89 is connected. Thus, both tubes 84 and 91 are operated at substantially the same plate voltage. A potentiometer in the form of adjustable resistance 96 is associated with meter 93 to provide means for varying the sensitivity of the meter, and to enable adjustment of the needle thereof to any predetermined calibration mark on its scales, for a purpose to be subsequently explained. The grid of tube 91 is connected through conductor 97 with resistor 98 in turn connected to conductor 99 which is connected to conductor 101 connected between resistors 80 and 81, and at the junction between resistors 86 and 87. Hence, both tubes 84 and 91 are also operated at substantially the same applied grid voltage.

As with respect to the Fig. 3 modification, during that part of each cycle of the input pulsating current when no current impulse or potential is applied to the control grid of input tube 83, current flows through tube 83 to charge condenser 88 a fixed amount; and during such part of each cycle, the grid of tube 84 is normally biased to cut-off to block the flow of current from its cathode. Also, during such part of each cycle, the control grid of tube 91 which is of the same character as tube 84 and is operated at substantially the same applied grid and plate voltages as tube 84, is biased to cut-off so as to block the flow of current through tube 91. Condenser 102, connected between resistors 89 and 98, will be normally charged, during this period, to a fixed voltage equal to the sum of the voltages across resistors 81 and 82.

During the second part of each cycle of the input pulsating current, when an impulse of current is supplied to the input circuit, by closing of contacts associated with the means the frequency of which is to be indicated or measured, in the manner previously described, the applied potential to the grid of tube 83 blocks the flow of current through such tube. This results in condenser 88 discharging a fixed quantity of current to unblock the grid of tube 84, in the manner explained with respect to Fig. 3. During the period that the grid of tube 84 is unblocked, a current caused by the potential difference between cathode and plate of tube 84, as determined by the voltage drop across resistor 82, will flow from the cathode of such tube to the plate and through resistor 89 back to the source of power. However, since only a fixed quantity of current can flow through tube 84 as determined by the fixed discharge current from condenser 88, only a fixed quantity of current can flow through resistor 89.

Such fixed quantity of current flowing through resistor 89 and tube 84 while condenser 88 is discharging, causes a voltage drop to appear across resistor 89 which is of such polarity that point D is negative with respect to point E; it being understood that direct current is applied to the voltage divider resistors 80, 81 and 82, and that the corresponding terminals thereof have the same polarity as indicated in Fig. 4. Condenser 102 will thus discharge partially through tube 84; along the following path: resistor 98, conductor 99, conductor 101, resistor 81, the cathode of tube 84, through the tube 84, and past point D back to condenser 102. Such partial discharge will continue until condenser 102 reaches a voltage equal to the difference between the sum of the voltage drops across resistors 81 and 82, and the voltage drop across resistor 89. During such discharge of condenser 102, a voltage will also appear across resistor 98, of such polarity, that point F is negative with respect to point G. A voltage drop of this polarity across resistor 98 will, however, have no effect on tube 91, as the grid of such tube is still biased to cut-off, as previously explained.

When the discharge of condenser 88 is complete, tube 84 will cease to pass current, because then there will be no opposition voltage to unblock the grid thereof, and the voltage drop across resistor 89 will disappear. Condenser 102 will, hence, become charged again to a voltage equal to the sum of the voltages across resistors 81 and 82, along the following path: conductor 101, conductor 99, resistor 98, across condenser 102, resistor 89, and back to resistor 82. Such flow of current will continue only as long as condenser 102 is being charged, and will cause a voltage to appear across resistor 98, of such polarity that point F will be positive with respect to point G. Resistor 98 is of such resistance that the voltage drop across it is higher than the voltage drop across resistor 81. Hence, the grid of tube 91 will be made positive with respect to the cathode during the time it takes condenser 102 to be charged again, and current will flow from cathode to grid of tube 91, due to the voltage drop across resistor 98, along the following path: from the negative terminal of resistor 81, through resistor 81, conductor 92, from the cathode to the grid, and conductor 97 to point F. During the time that the grid of tube 91 is driven toward the positive region, tube 91 will allow a current to flow, caused by the potential difference between its cathode and plate, as determined by the voltage drop across resistor 82, to move the meter needle to obtain an indication in the manner already described.

As the unblocking of the grid of tube 91 occurs only during the time that condenser 102 is being charged, subsequent to the discharge of condenser 88 which, as previously explained, discharges a fixed quantity of current for each input impulse of current irrespective of how long in duration such impulse of current may be, and since such period of charging of condenser 102 will be of the same duration at all times, inasmuch as the condenser is of fixed capacitance and the resistances associated therewith are of fixed value, it is apparent that a fixed quantity of current will flow through meter 93 for each input impulse irrespective of the duration or quantity of such input impulse; and input tube 83 will serve the same purpose of rendering the apparatus non-sensitive to input voltage variations, as tube 67 in Fig. 3. Hence, since the impulses of current are proportional to the frequency of the means to be measured or indicated, meter 93 will accurately indicate such frequency. Thus, it is seen that condenser 102 forms part of a closed regulating or measuring circuit, similar to the regulating circuit including condenser 88; the two regulating circuits acting in succession. For greater amplification, more tubes may be connected in the manner described. Also, if desired more than one tube may be employed in a single envelope, in accordance with well known practice.

It is, of course, necessary that the time for condenser 88 to discharge and the time for condenser 102 to recharge, be less than the duration of the input impulse, for the reasons previously explained with reference to the prior described systems. The values of the various elements making up the circuit to obtain this result can be readily determined. In the commercial form of the apparatus, adapted for operation from a commercial power line supplying standard voltages and frequencies (for example, an alternating current 110 volt, 60 cycle line), resistors 80, 81 and 82 are of such resistance as to provide, respectively, voltage drops of about 113, 12, and 250 volts which, of course, may vary, in accordance with variations in main line voltage. For this purpose, resistors 80, 81 and 82 are, respectively, of about 6,780, 720 and 15,000 ohms. Input tube 83 is preferably of the No. 2A6 type known as the "Duplex-diode high-mu/triode", and tubes 84 and 91 are each of the character of one of the triode sections of the type known as 53. Tubes 84 and 91 may be combined in one envelope, in which case type 53 may be employed. Resistor 86 is of about 750,000 ohms, resistor 87 of about 500,000 ohms, resistor 89 of about 100,000 ohms, and resistor 98 of about 100,000 ohms; while condenser 88 is of about 0.00025 microfarad and condenser 102 of about 0.005 microfarad. The resistance of potentiometer 96 is of about 25,000 ohms, while meter 93 is preferably a 0 to 1 milliammeter provided with any suitable scales, as will be subsequently explained.

The means for supplying power from an alternating current power line to operate the circuit of Fig. 6 will now be described. Connectable with the conductors 111 of a standard alternating current power line is a power transformer 112 having three secondary windings 113, 114 and 116 for connection with the associated equipment. Winding 116 is a low voltage winding, of about 2½ volt output, used to supply filament power for the tubes 83, 84 and 91; through conductors 117 which for purposes of clarity are not shown connected to the filaments of the tubes. The outside terminals of winding 114 are connected to the two plates of a conventional full wave rectifier tube 118, the filament of which is heated from winding 113 having a voltage output of about 5 volts. Winding 114 is a high voltage secondary having a voltage output of about 375 volts each side of the center tap 119 which is connected to one side of the load resistance including resistors 80, 81 and 82; the other side of the load resistance being connected to winding 113 by center tap 121.

Transformer 112 and rectifier tube 118, thus, form a conventional full wave rectifier circuit for converting the alternating current to direct current. Condenser 122, of a comparatively high capacity of about 10 microfarads, is connected across the load resistance to maintain the current through resistors 80, 81 and 82 at a substantially constant value during rectification changes. In some localities where power line voltages fluctuate widely, any suitable form of voltage regulator may be connected in association with the primary conductors 111 to maintain the voltage applied to transformer 112, substantially constant.

The apparatus of Fig. 4 thus far described, will operate successfully if the current input impulses to input tube 83 are controlled by means of the making and breaking of contacts, the operation of which is proportional to the frequency to be measured. However, it is preferred to employ means adapted for direct connection with the commercial alternating current power line, the frequency of which is known and fixed, for enabling calibration of the apparatus. Also, since the apparatus has found great applicability for obtaining indications of the R. P. M. of a gas engine, we employ with the apparatus means adapting it for quick and facile connection to the ignition system of a gas engine, to enable the making and breaking of the distributor contact points thereof to supply the current pulsations to tube 83.

For these purposes, the cathode and the grid of tube 83 are connected by conductors 130 to any suitable double pole double throw switch 131, adapted in one position to connect with leads 132 adapted for connection, by suitable clips 133, across the terminals of the primary of the ignition coil of an engine. Because the connection need only be made through leads 132 and clips 133, it is apparent that the apparatus can be quickly and easily connected to or disconnected from the ignition coil. In the other position of switch 131, the tube 83 can be connected with the power line 111 through conductors 134 adapted for connection to such power line. Resistor 136, shunted across conductors 130, serves the same purpose as resistor 71 in Fig. 3, namely, to maintain grid circuit continuity and circuit stability. Preferably, such resistor is of about 100,000 ohms. For half wave rectification purposes when tube 83 is connected to the power line for calibration of the apparatus, as will be subsequently explained, the two diode plates 137, which are elements of a 2A6 tube, are connected together and to the grid of tube 83.

The impulses which appear across the primary of an ignition coil, to which leads 132 are adapted for connection, contain comparatively high frequency oscillations and surges, due to the high inductance of the secondary coil and the design of an engine ignition circuit. Hence, suitable filtering means should be employed in the input leads to the apparatus to eliminate these undesirable and variable components, and allow a substantially steady voltage to be applied to the grid of tube 83 when such grid becomes biased to cut-off, and thus block the flow of current through tube 83 upon closing of the distributor contact points.

Such filtering means includes an air core choke 138 of about 300 turns of No. 20 wire, layer wound on an approximately ½ in. diameter form, to allow passage of a minimum amount of high frequency current into the input circuit of the apparatus, and to prevent also the suppression of high frequency surges across the primary of the ignition coil. To suppress any high voltage, low current surges which might pass through choke 138, resistor 139, having a comparatively low resistance of about 500 ohms, is connected between leads 132. Also included in the filtering means, is iron core, high-inductance choke 141 of about 900 turns of No. 24 wire wound on an "E" type laminated iron core having an air gap of about 0.005 in., and a center leg having a cross section of about ¾ in. square. Choke 141, due to its high inductance, completes the filtering out of transient high frequencies, and allows substantially the original battery potential associated with the engine, to be built up between the grid and the cathode of tube 83 each time the ignition contacts close.

When leads 132 are connected across the primary of the ignition coil, it is apparent that the polarity of the resulting potential applied to the grid of tube 83 when the ignition contacts are closed, must be negative to bias tube 83 to cut-off.

To determine whether such polarity is correct, a center reading voltmeter 146, which serves as a polarity indicator, is connected across leads 132. If an incorrect connection is made across the ignition coil, the operator by noting the polarity reading on meter 146, need only reverse the connections of leads 132 to provide correct polarity.

When the input to tube 83 is connected by switch 131 to leads 132 in turn connected across the primary coil of an operating engine, it will be apparent that each time the ignition contacts close, an impulse of current will be fed to input tube 83 of the apparatus, which through the previously described operation of the apparatus, will cause a fixed quantity of current of fixed duration to be fed through the output tube 91 to meter 93, irrespective of how long the contacts remain closed, and irrespective of the voltage across the ignition coil. As the opening and closing of such ignition contacts is directly proportional to the speed of the engine and since such fixed output current is supplied through meter 93 for each cycle of operation of the contacts, the needle of meter 93 will assume varying positions directly proportional to the R. P. M. of the engine.

The frequency of operation of the ignition contacts per revolution varies with the number of cylinders in the engine. For example, an eight cylinder engine will have the ignition contacts complete four cycles of operation for each revolution of the engine crankshaft. Thus, when the apparatus is connected to an eight cylinder engine, four impulses of current will be fed to the input of the apparatus for each engine revolution. With a six cylinder engine, three impulses will be supplied to the input for each revolution. To provide for this, the face of meter 93 may have various scales corresponding to the type of engine being tested.

Calibration of the apparatus, which will now be described, enables an accurate reading of meter 93 in comparison with a standard of known frequency, inasmuch as the frequency of an A. C. power line is maintained constant by the power companies. When the apparatus is to be calibrated, switch 131 is operated to connect the input to tube 83 with conductors 134 in turn connected to the power line 111 which is in most instances a 60 cycle line. The two diode plates 137, connected in the manner previously related, cooperate to provide a half wave rectifier to convert the A. C. sine wave voltage to input impulses to tube 83, which are of the same frequency as the line frequency. If desired, any other half wave rectifier of similar characteristics may be employed instead.

Resistor 147 which is preferably of about 7,500 ohms, forms in series with resistor 136, a voltage divider; and by suitable choice of the relative values of resistors 136 and 147, a wide variation in voltages may be applied across points X and Y without damage to tube 83. When the input voltage from power line 111 is such that point X is negative with respect to point Y, the voltage between grid and cathode of tube 83 will be a fraction of the voltage of line 111 depending on the relative values of resistors 136 and 147, and the grid of tube 83 will be biased to cut-off.

Upon change in the power line input voltage so that point X is positive with respect to point Y, diode plates 137 will be made positive with reference to the cathode of tube 83, and a current will flow from the cathode to diode plates 137. During the time this condition obtains, the resistance between diodes 137 and the cathode, is very small compared to the resistance of resistor 147, and the major part of the power line input voltage will appear across resistor 147. Thus, the positive half cycles of the alternating current will have negligible effect on the grid of tube 83; such grid being biased to cut-off by the negative portion of each cycle of the alternating current. As a result, for each cycle of the alternating current in power line 111, a fixed impulse of current will flow throughout the output tube 91 to actuate meter 93, the needle of which will assume a position dependent upon the frequency of the power line current. This frequency being known, accurate readings of other output frequencies to be measured, can be determined from the position of the meter needle in comparison with the position it was found to have at the fixed known frequency. By adjusting the potentiometer 96, the needle of meter 93 may be adjusted to a predetermined calibration point on the scale selected for reading; each of the scales being uniformly graduated and having a point corresponding to the known calibrated frequency. It is apparent from the preceding description that the apparatus itself can be used to indicate the frequency of any alternating current.

In operation of the apparatus of Fig. 4, the operator may first select the scale on meter 93 to be read, in accordance with the type of engine to be tested, connect the apparatus to calibration, adjust potentiometer 96 so that the needle assumes the known frequency on the scale of the meter to be read, and then connects the apparatus to test position. As the apparatus has a frequency characteristic which is substantially linear over the entire range, the needle will with accuracy indicate the frequency being measured on the scale selected.

Although in the Fig. 4 modification, we have described in detail a present form of an apparatus particularly adapted for indicating R. P. M. of an engine, it is apparent that our invention has wide applicability for measuring any type of frequency; it being only necessary to have means associated with the frequency to be measured, for creating current impulses to various forms of the apparatus, directly proportional to the frequency. Such means is conveniently a circuit maker and breaker which is already present in a gas engine in the form of ignition contacts. With respect to devices which do not have such means, it can be readily incorporated as part of the apparatus, to be operated directly proportional to the frequency to be measured.

Figure 5:
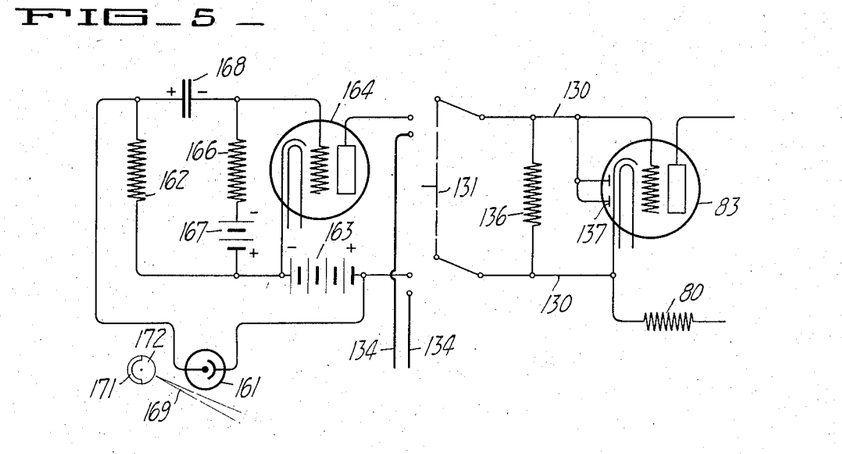
Fig. 5 illustrates schematically a form of circuit making and breaking mechanism including a photoelectric cell which cooperates in creating a pulsating current proportional in frequency to a movable element, the frequency of which is to be measured.

Instead of a circuit maker and breaker in the form of a switch for creating the pulsating input current proportional in frequency to the frequency to be measured, a photo-electric cell circuit may be employed. Such photo-electric cell form of circuit maker and breaker is particularly adapted for association with any movable mechanism or element having a frequency of movement to be measured, such as a rotating shaft or fan. Fig. 5 illustrates a preferred form of photo-electric cell circuit which is shown connected to the type of circuit illustrated in Fig. 4, although it may be connected, in an obvious manner, to any of the other described forms of circuits. For purposes of clarity, only a portion of the Fig. 4 circuit is shown in Fig. 5, and the elements comprising such portions are indicated by the same reference characters applied to the corresponding elements in Fig. 4. Such photo-electric cell circuit will now be described.

Photo-electric cell 161, of any suitable construction, is connected in series with resistor 162 to provide a voltage divider system across battery 163 or any other suitable source of potential. Battery 163 also serves as a B-battery to apply to the plate of vacuum tube 164 a potential which is positive with respect to the cathode of such tube; the control grid of tube 164 being connected through resistor 166 to C-battery 167 in turn connected to the cathode of tube 164. A condenser 168 is connected between the grid of tube 164, and the junction of resistor 162 and cell 161. The described photo-electric cell circuit takes the place of the connecting leads 132 and associated elements in Fig. 4. It is connectable by switch 131 to input tube 83 which may be connected to the alternating current power line leads 134, for the same purposes described with reference to Fig. 4.

In operation, C-battery 167 is adapted to apply a negative potential to the control grid of tube 164 to bias it to cut-off and thereby block the flow of current through tube 164. However, tube 164 is adapted to be intermittently unblocked to pass current, upon variations in the resistance of photo-electric cell 161 as controlled by variations in light reflected from light beam 169. Such variations of the reflected light may be caused by having a white band 171 partially about rotating shaft 172, or any other similar mechanism the frequency of which is to be measured. As shaft 172 rotates, it will, because of variations in reflected light, vary the intensity of light on the cell. Thus, cell 161 will have a fluctuating resistance that will rise and fall in proportion to the speed of rotation of shaft 172. These fluctuations in resistance cause variations in the voltage drop across resistor 162 which causes condenser 168 to charge and discharge in synchronism with the variations in voltage across resistor 162.

The discharge and the charge current of condenser 168 will flow through resistor 166; and during the time condenser 168 is being charged, a voltage in opposition to the applied voltage of C-battery 167 will obtain, to cause unbiasing or unblocking of the control grid of tube 164 to thereby allow such tube to pass current. During the time condenser 168 is discharging, tube 164 will remain biased to cut-off. Hence, tube 164 will supply to input tube 83, the pulsating current proportional in frequency to the speed of rotation of shaft 172.

In place of batteries 163 and 167, any suitable voltage dividers in the form of resistors may be employed. Should this be done, the resistors may be connected to the source of power in any suitable manner. Cell 161 is, preferably, of the emissive type operable at a potential of about 90 volts; and tube 164 is, preferably of the type known as 2A6, the control grid of which can be biased to cut-off by an applied potential of about 2 volts. Hence, source of potential 163 is of about 90 volts, and source of potential 167 any suitable potential above 2 volts. To enhance sensitivity of the photo-electric cell circuit, resistor 162 should be of a sufficiently high value to equal approximately the average resistance value of cell 161. A suitable resistance value for this purpose is in the order of 1 megohm. Resistor 166 is, preferably, substantially the same high value as resistor 162 to cooperate with resistor 162 in maintaining circuit stability; and condenser 168 is, preferably, of about 0.005 microfarad, capacitance.

From the preceding explanation, it will be seen that the photo-electric cell circuit functions the same as an actual circuit maker and breaker for creating input current pulsations or impulses which are proportional in frequency to the frequency being measured. In all forms of the measuring apparatus of our invention, even though the quantity of current, in each input impulse or pulsation, may vary with variations in the frequency being measured, the current regulating means will measure out or meter only a fixed quantity of current to provide the accurate indications by the indicating meter. In other words, although there may be variations in the quantities of electricity supplied by the input impulses, the regulating means measures out or meters, to the output of the apparatus, the same predetermined fixed quantity or amount of electricity for each input pulsation, irrespective of the quantity of electricity supplied by such input pulsation. Thus, the apparatus is unaffected by variations in the quantities of current or energy supplied by the input pulsations.

We claim:

1. An apparatus for measuring frequency comprising an electrical circuit including means for enabling operation of said apparatus from a source of pulsating current of known frequency, and having input means for receiving a pulsating current of unknown frequency the pulsations of which vary in quantity with and are proportional in frequency to the frequency to be measured, a meter in said circuit, means associated with said meter for adjusting said meter, electrical regulating means in said circuit connected between said input means and said meter for measuring a fixed quantity of current to said meter for each pulsation of said current of unknown frequency irrespective of the quantity of such pulsation, a calibrating circuit associated with said input means adapted for connection with said source of pulsating current of known frequency to enable calibration of said meter in conjunction with said adjusting means, and means for optionally connecting said input means with said calibrating circuit or with the source of said pulsating current of unknown frequency.

2. In an apparatus of the character described, an electrical circuit for receiving a pulsating current the pulsations of which may vary in quantity, an electron discharge device in said circuit having a control grid for controlling flow of current, means in said circuit for applying a potential to said control grid sufficient of itself to bias said grid to cut-off and block the flow of current through said device during each cycle of said pulsating current, and current regulating means in said circuit connected to said grid and to said biasing means, said current regulating means including capacitor means for unblocking said grid and allowing flow through said device during a part of each cycle of said pulsating current of a fixed quantity of current.

3. In an apparatus of the character described, an electrical circuit for receiving a pulsating current the pulsations of which may vary in quantity, an input electron discharge device in said circuit having a control grid connectable to said source of pulsating current for controlling flow of current through the device, means in said circuit for applying a potential between the cathode and the plate of said device to cause flow of current therethrough during that part of each cycle of said pulsating current when no potential is applied to said control grid, said control grid serving to block the flow of current through said device during that part of each cycle of said pulsating current when potential is applied to said control grid, and current regulating means connected between the plate of said input device and said potential applying means, said current regulating means including capacitor means which is charged with a fixed quantity of current irrespective of how long current flows through said device and which discharges such fixed quantity of current when the flow of current through said device is blocked.

4. An apparatus for measuring the frequency of operation of a movable mechanism having means associated therewith for creating a pulsating current the pulsations of which vary in duration with and are proportional in frequency to the frequency to be measured, comprising an electrical circuit adapted for connection with the source of pulsating current, a meter in said circuit, an input electron discharge device in said circuit having a control grid connectable to said source of pulsating current for controlling flow of current through such device, another electron discharge device in said circuit having a control grid for controlling flow of current through such device and to said meter, means in said circuit for applying a potential to said grid of said another device to bias said grid to cut-off and thereby block the flow of current to said meter during one part of each cycle of said pulsating current, means in said circuit for applying a potential between the cathode and the plate of said input device to cause flow of current therethrough during said one part of each cycle of said pulsating current, said control grid of said input device serving to block the flow of current through said input device during a second part of each cycle of said pulsating current, and current regulating means in said circuit connected between the grid of said another device and the plate of said input device and between said potential applying means; said current regulating means including capacitor means which is charged with a fixed quantity of current during said one part of each cycle when current flows through said input device, and which discharges during the second part of each cycle when the flow of current through said input device is blocked for unblocking said grid of said another device and allowing flow through said another device of a fixed quantity of current.

5. An electrical tachometer for measuring the revolutions of an internal combustion engine having an ignition system including ignition contacts the operation of which creates current pulsations proportional in frequency to the number of revolutions, comprising an electrical circuit having input leads to receive said current pulsations, a meter in said circuit, means in said circuit for amplifying said pulsations, means in said circuit associated with said amplifying means for measuring a fixed quantity of current to said meter for each current pulsation irrespective of the duration of such pulsation, and means for calibrating the meter from an alternating current line of known frequency.

6. An electrical tachometer for measuring the revolutions of an internal combustion engine having an ignition system including ignition contacts the operation of which creates current pulsations proportional in frequency to the number of revolutions, comprising an electrical circuit having input leads to receive said current pulsations, filtering means associated with said leads for eliminating high frequency oscillations and surges originating in said ignition system, a current meter in said circuit, means in said circuit for measuring a fixed quantity of current to said meter for each current pulsation irrespective of the duration and voltage of such pulsation, and means for calibrating said meter.

7. In an apparatus of the character described, an electron discharge device including a control grid, means for applying a potential to said grid to bias said grid to cut-off and thereby block the flow of current through said device, a regulating circuit connected between said grid and said potential applying means and including condenser means and resistor means, and means associated with said regulating circuit for enabling charging of said condenser means upon application of potential thereto and discharging of said condenser means upon disappearance of such potential, the regulating circuit being so connected with said grid and said potential applying means as to apply a current in opposition to said potential applying means during the discharge period of said condenser means and thereby allow a fixed quantity of current to pass through said device.

8. An apparatus for measuring the frequency of operation of a movable mechanism comprising a photo-electric circuit adapted for association with said mechanism for creating a pulsating current the pulsations of which vary in quantity with and are proportional in frequency to the frequency to be measured, a circuit connectable with said photo-electric circuit and including a meter therein, and means in said latter circuit for measuring a fixed quantity of current to said meter for each current pulsation irrespective of the quantity of such pulsation.

9. Apparatus for measuring frequency comprising an electron discharge device having an output circuit and a control circuit, an indicating device electrically responsive to flow of current in said output circuit as determined by said control circuit and means responsive in proportion to the frequency to be measured for periodically altering the control effect of said control circuit for constant time intervals.

10. Apparatus for measuring frequency comprising an electron discharge device having anode, cathode and control electrodes, an output circuit for said device including said anode and cathode electrodes and having an indicating instrument associated therewith, a control circuit for said device including said cathode and control electrodes and a source of biasing potential sufficient to normally bias said discharge device to a non-conductive condition, a condenser discharging circuit associated with said control circuit to unbias said discharge device during discharge for a period in accordance with the magnitude of charge on said condenser, means for periodically charging said condenser to a predetermined value at least once per integral number of cycles of the frequency to be measured, said predetermined value being the same irrespective of the value of said frequency, and discharging the same to thereby periodically render said discharge device conductive at a rate in proportion to the frequency being measured, whereby said indicating device will measure the value of said frequency.

11. A tachometer comprising apparatus responsive to phenomena indicative of the velocity of mechanism whose velocity is to be measured and requiring a source of power for operation thereof, and means for utilizing the same source of power to calibrate said tachometer.

12. Frequency indicating apparatus comprising an electron discharge device and associated circuits including means enabling energization of said device from a source of fluctuating current, and calibrating means for said frequency indicating apparatus connectable to said same source of fluctuating current for utilizing the frequency of said source as the calibrating frequency.

13. Frequency indicating apparatus requiring for operation thereof energy from a source of power, means enabling said energy to be derived from a source of pulsating current, calibrating means for said frequency indicating apparatus, and means enabling use of the same source of fluctuating current for providing the calibrating frequency for said calibrating means.

14. Frequency indicating apparatus requiring for operation thereof energy from a source of power, means enabling said energy to be derived from a source of pulsating current, calibrating means for said frequency indicating apparatus, and common lead means connectable to said source of pulstating current for enabling said source to provide both the energy for said frequency indicating apparatus and the calibrating frequency for said calibrating means.

15. A frequency measuring system of the electron discharge device type for indicating speed of movable mechanism having an electrical system which creates current pulsations proportional to the speed of such mechanism, comprising input means adapted for connection to said electrical system to receive said pulsations, an electron discharge device, a meter associated with said electron discharge device, control means associated with said electron discharge device and said meter including a control element for said device for allowing periodic blocking and unblocking of passage of current through said device proportionally to said pulsations and mechanism for causing flow to said meter of a fixed quantity of current for each pulsation irrespective of the quantity of such pulsation, and means enabling said frequency measuring system to be energized for operation from a source of pulsating current independent of said electrical system.

16. A frequency measuring system of the electron discharge device type for indicating speed of movable mechanism having an electrical system which creates current pulsations proportional to the speed of such mechanism, comprising input means adapted for connection to said electrical system to receive said pulsations, an electron discharge device, a meter associated with said electron discharge device, control means associated with said electron discharge device and said meter including a control element for said device for allowing periodic blocking and unblocking of passage of current through said device proportionally to said pulsations and mechanism for causing flow to said meter of a fixed quantity of current for each pulsation irrespective of the quantity of such pulsation, said electron discharge device and said latter mechanism being so associated that the operation of one is correlated only with the operation of the other for determining flow of current to said meter.

JOHN E. ECHLIN.
LENNART G. ERICKSON.